US006999589B2

(12) United States Patent
Cato et al.

(10) Patent No.: US 6,999,589 B2
(45) Date of Patent: Feb. 14, 2006

(54) METHOD AND SYSTEM FOR AUTOMATIC BROKERED TRANSACTIONS

(75) Inventors: Robert Thomas Cato, Raleigh, NC (US); Phuc Ky Do, Morrisville, NC (US); Eugene Michael Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 09/941,877

(22) Filed: Aug. 29, 2001

(65) Prior Publication Data

US 2003/0044015 A1    Mar. 6, 2003

(51) Int. Cl.
*H04K 1/00* (2006.01)

(52) U.S. Cl. .................. 380/270; 705/78; 713/153

(58) Field of Classification Search ............... 705/53, 705/77–78; 713/153; 380/270
See application file for complete search history.

(56) References Cited

U.S. PATENT DOCUMENTS

| | | | |
|---|---|---|---|
| 5,905,719 A | * | 5/1999 | Arnold et al. .............. 370/330 |
| 5,917,913 A | | 6/1999 | Wang |
| 5,924,082 A | | 7/1999 | Silverman et al. |
| 6,141,653 A | | 10/2000 | Conklin et al. |
| 6,175,922 B1 | | 1/2001 | Wang |
| 6,922,675 B1 | * | 7/2005 | Chatterjee et al. ............ 705/26 |

FOREIGN PATENT DOCUMENTS

GB    229829    5/2003

OTHER PUBLICATIONS

"Ebay for Dummies", Woerner et al., IDG Books Worldwide, 1st edition, 1999.*

* cited by examiner

*Primary Examiner*—Gregory Morse
*Assistant Examiner*—Thomas Ho
(74) *Attorney, Agent, or Firm*—Sawyer Law Group LLP

(57) ABSTRACT

A method and system for brokering a transaction between a plurality of wireless communication devices is disclosed. The method and system includes enabling a plurality of wireless devices to communicate with one another, allowing a user to enter a request related to an object to be brokered into a first enabled wireless device, and exchanging the request with a plurality of enabled wireless devices. The system and method also includes receiving a response to the request by a third party facilitator from a user of a wireless device interested in completing the transaction. The third party facilitator will then complete the transaction between users of the first wireless device and the wireless device interested in completing the transaction. In another aspect of the present invention, at least one wireless broker device helps disseminate the request from the first wireless device to the wireless device interested in completing the transaction. The system and method includes concealing the identity of a user of the wireless device from which a broker device received the request, thereby preserving the broker device's profit interests in the transaction, and distributing transaction proceeds to the at least one wireless broker devices.

54 Claims, 5 Drawing Sheets

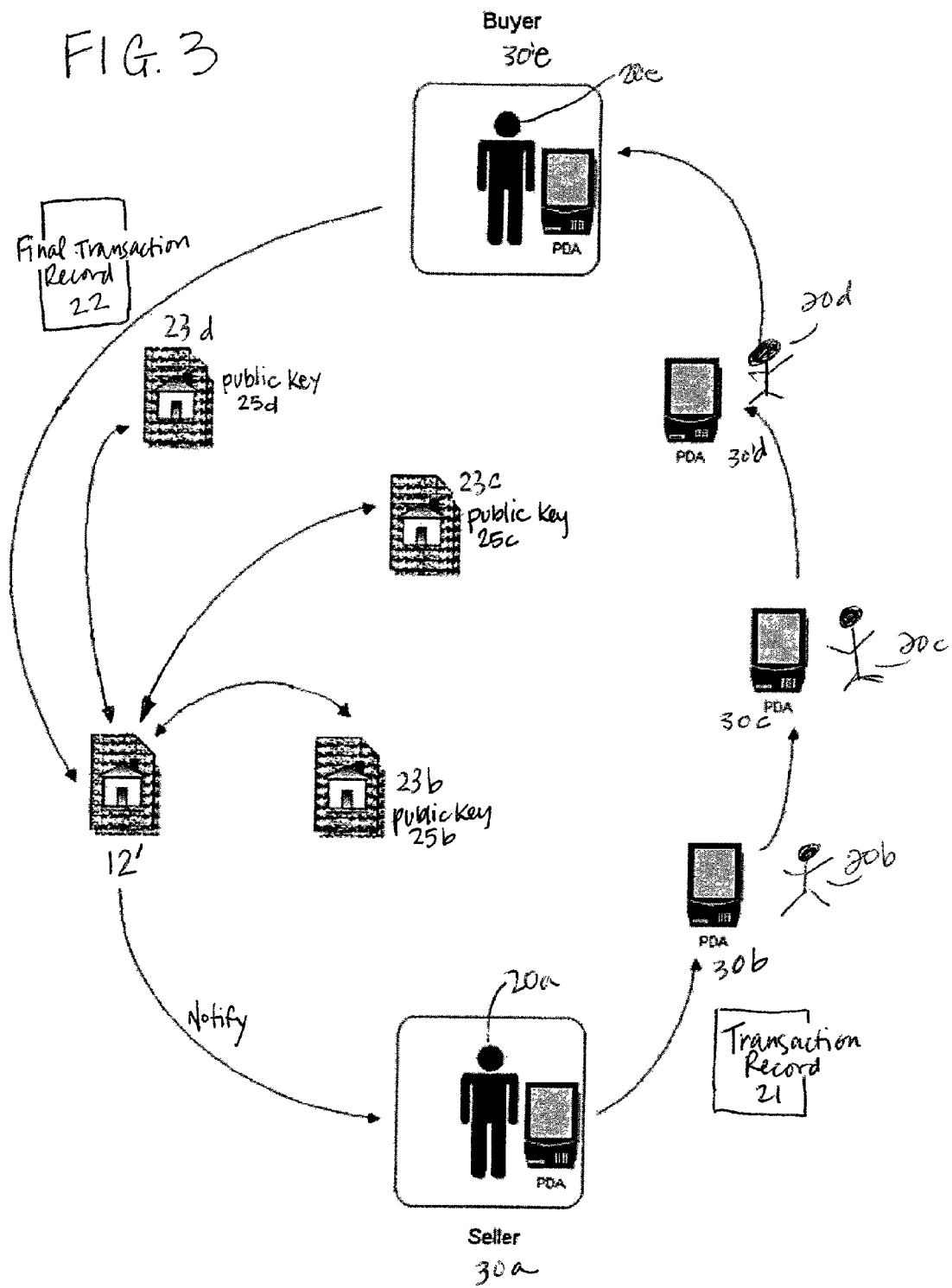

METHOD AND SYSTEM FOR AUTOMATIC BROKERED TRANSACTIONS

FIELD OF THE INVENTION

The present invention relates to brokered transactions and more particularly to a method and system for automatic brokered transactions using wireless communication devices.

BACKGROUND OF THE INVENTION

Buying or selling an item usually entails informing others, generally strangers, of the item sought or being sold. Typically, the more people who are informed, the better the chances of finding or selling the item for an appropriate price. Traditional venues for advertising the item include newspapers and on-line auction sites. Nevertheless, posting in such venues can be expensive, particularly if the item will be posted in several newspapers or websites.

Another approach to spreading information about an item is using a distribution system, e.g., a plurality of brokers. For example, in the real estate industry, brokers represent property buyers and sellers. The brokers have access to information about demand, housing supply in a neighborhood and price information. Generally brokers work diligently to find a buyer or seller for their clients, and broker fees are reflective of this effort. Thus, it is cost prohibitive to hire multiple brokers, although doing so would increase the likelihood of completing a transaction.

Accordingly, a need exists for a method and system for informing a large number of potential buyers and sellers about items for sale or for purchase without incurring the associated expenses of marketing and advertising. The present invention addresses such a need.

SUMMARY OF THE INVENTION

The present invention provides a method and system for brokering a transaction between a plurality of users of wireless communication devices. The method and system include enabling a plurality of wireless devices to communicate with one another, allowing a user to enter a request related to an object to be brokered into a first enabled wireless device, and exchanging the request with a plurality of enabled wireless devices. The system and method also include receiving a response to the request by a third party facilitator from a user of a wireless device interested in the object. The third party facilitator will then complete the transaction between a user of the first wireless device and the user of the wireless device interested in the object.

In another aspect of the present invention, at least one wireless device acts as a broker between the first wireless device and the interested wireless device, charging a broker's fee for its assistance in disseminating the request to other wireless devices. To protect and preserve the broker's interests in the transaction, i.e., to ensure that the broker is not "cut out" of the loop, the system and method include concealing the identity of the user of the wireless device from which a broker device received the request, and appending to the request the identity of the broker's user. When the transaction is finally completed, the third party facilitator will determine identities of the brokers' users and pay them accordingly. Because the transaction is automated, it requires essentially no effort on the part of a broker to make a profit on a transaction. Thus, the broker's fee for its involvement can be relatively small, and more brokers can participate in the transaction.

In a preferred embodiment, the wireless devices are Bluetooth enabled devices. Thus, the wireless devices need only come in proximity to one another in order to transmit and receive information.

Through aspects of the present invention, exposure to an item for sale or for purchase grows exponentially as more and more wireless communication devices come within range of one another and exchange information. Thus, a request can be disseminated quickly and broadly with little extra effort or expense on the part of the device's owner. In addition, each device can be involved in multiple transactions where the device is a seller, a buyer, and a broker simultaneously. Thus, according to the present invention, the wireless communication device can earn money for its owner while it is being carried around.

DETAILED DESCRIPTION

The present invention relates to brokered transactions and more particularly to a method and system for automatic brokered transactions between users of wireless communication devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiment shown but is to be accorded the widest scope consistent with the principles and features described herein.

According to one preferred embodiment of the present invention, mobile and stationary wireless communication devices, such as personal digital assistants (PDAs), cellular phones, laptops, or desktop computers, are configured to transmit and receive data relating to an object to be brokered. Each wireless communication device can play one or more of the following three roles: a buyer, a seller, or a broker. As a buyer, the wireless communication device is seeking a particular object to purchase for a predetermined price; as a seller, the wireless communication device is selling an object for a particular price; and as a broker, the wireless communication device is neither selling nor buying an object, but informing other wireless communication devices of an object being sought or sold, and charging a broker's fee for its services.

As an owner of a mobile wireless communication device moves through a crowd, or comes within the proximity of a similarly equipped stationary device, the device exchanges data with other compatible devices thereby disseminating data seamlessly and transparently. In another preferred embodiment, a purchase or sale can be facilitated by an on-line service provided by a trusted third party facilitator ("facilitator"). The facilitator will identify the "parties" to the transaction, e.g., the buyer, the seller, and the brokers (if any), as defined by their respective wireless communication devices, and distribute the transaction proceeds from the buyer to the seller accordingly. The facilitator also distributes fees to intermediary broker devices that helped disseminate the information to the buyer (or seller). Thus, in accordance with the present invention, the owner of a wireless communication device can distribute buying and selling data to a broad community, which grows exponentially, and/or earn money merely by carrying his or her device.

Figure 1:
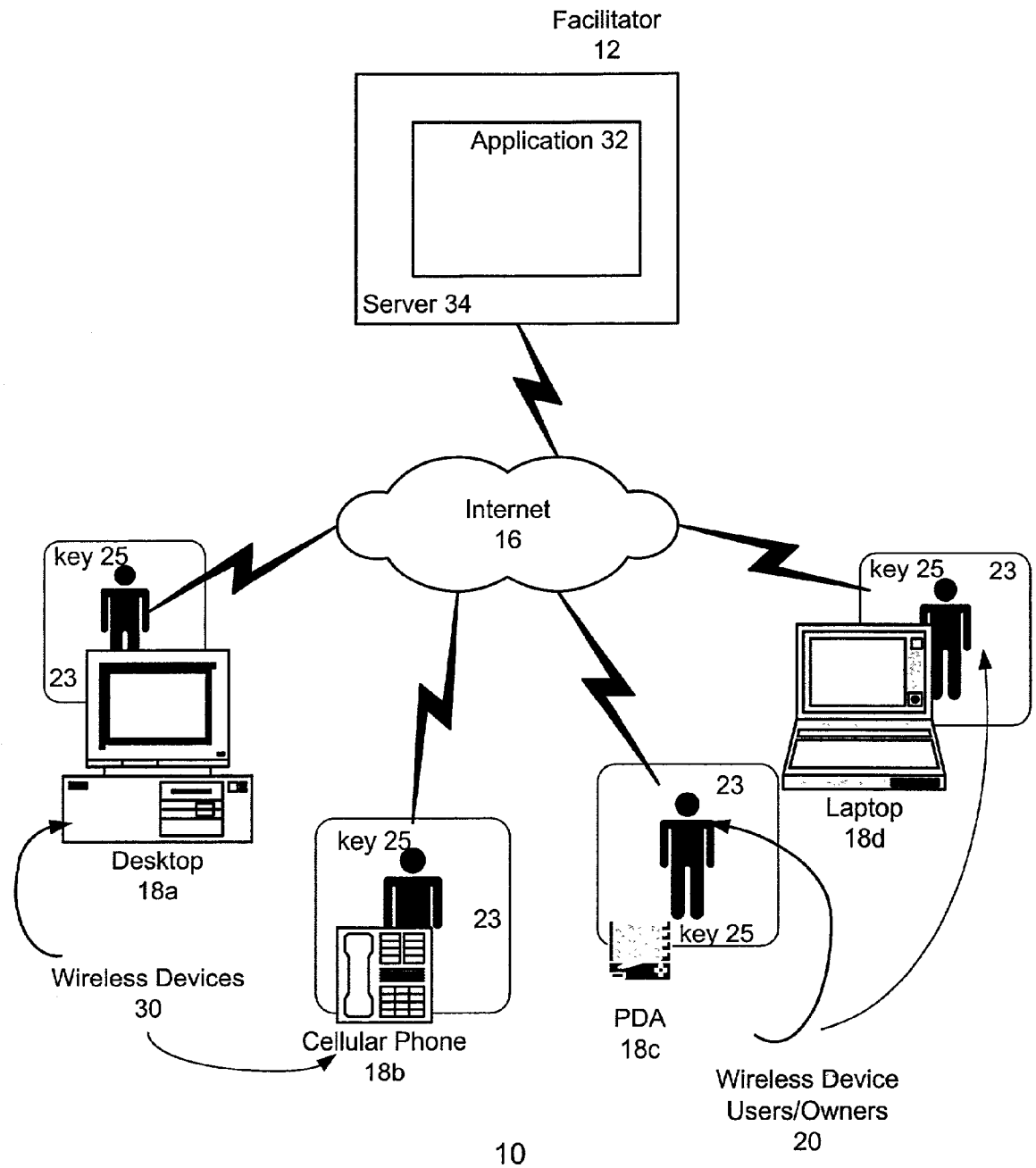
FIG. 1 illustrates a block diagram of the system in accordance with a preferred embodiment of the present invention.

FIG. 1 is a block diagram illustrating a system for automatic brokered transactions between wireless communication devices in accordance with the present invention. In a preferred embodiment, the system 10 includes an on-line third party facilitator 12 that is accessible over a network, such as the Internet 16, by a plurality of wireless communication device owners or users 20. As one skilled in the art would readily appreciate, the third party facilitator 12 can also be accessed directly via a LAN or WAN, and communication channels between the third party facilitator 12, the users 20 and/or the devices 30 can be wired or wireless.

In FIG. 1, the users 20 utilize a variety of wireless devices 30, e.g., desktop computers 18a, cellular phones 18b, PDAs 18c, and laptop computers 18d. Although the devices 30 themselves can be adapted to connect to the Internet 16 or any suitable network, such connectivity is not necessary according to the preferred embodiment of the present invention. Naturally, wireless devices 30 are not limited to those mentioned above, and can include any device 30 that has wireless communication capabilities. All users 20 have the ability to buy, sell, or broker transactions. Moreover, each user 20 maintains an associated website 23.

The third party facilitator ("facilitator") 12 includes a server 34 that hosts an application program 32. The facilitator 12 facilitates a brokered transaction. It does not buy or sell objects, nor does it set prices. Unlike other on-line services, the facilitator 12 does not list or post objects to buy or sell, nor does it allow users 20 to submit bids. Rather, the facilitator 12 provides a centralized clearing house that collects transaction information, directs the exchange of funds and objects, and distributes broker fees to the appropriate devices 30.

According to the present invention, each device 30 includes a transceiver (not shown) which is compatible with a wireless data transmission standard, such as Bluetooth (IEEE 802.15), although other wireless data transmission protocols may be used. Each device 30 is configured to run application software, either preloaded or downloaded, for communicating with other similarly configured devices 30.

Figure 2:
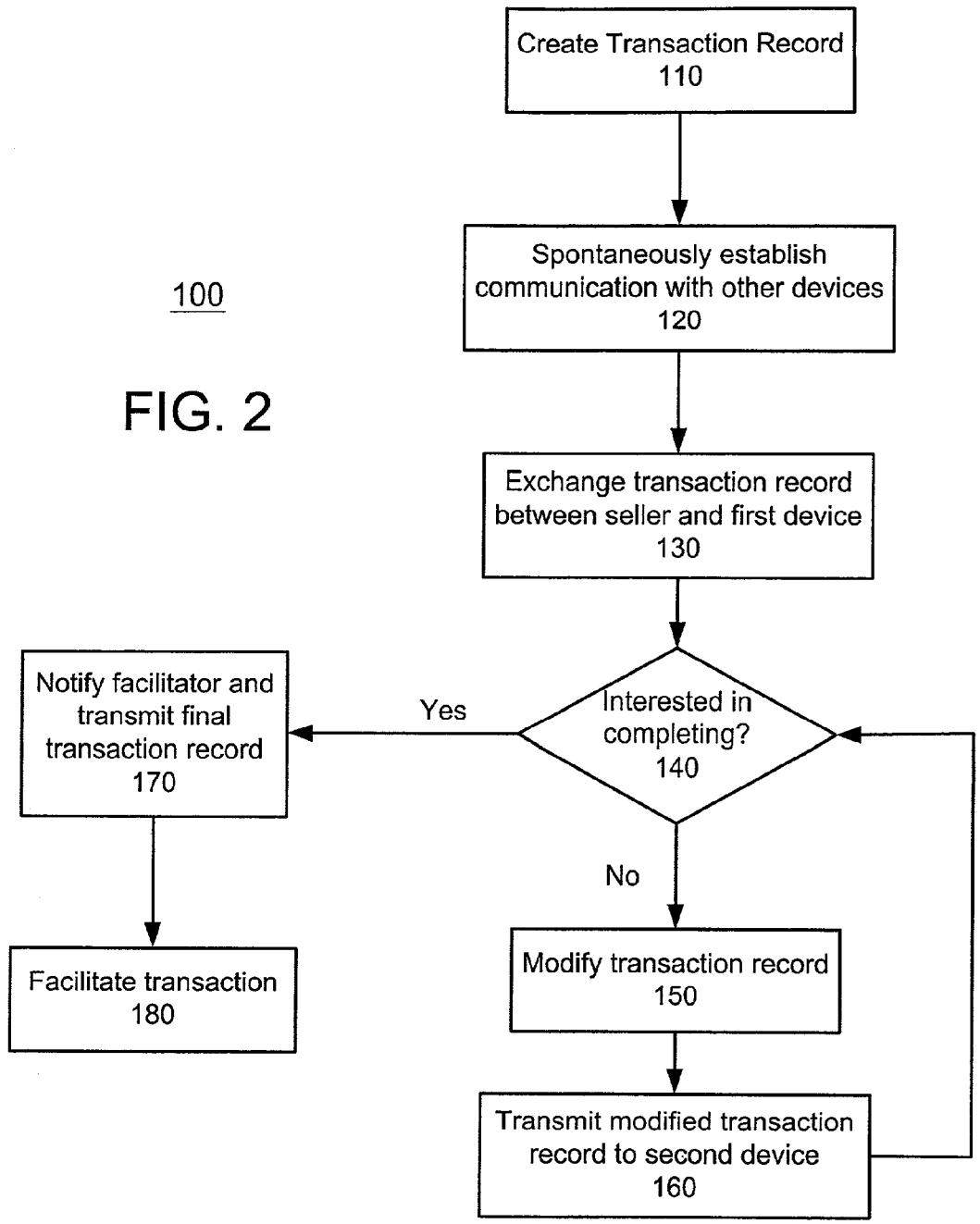
FIG. 2 illustrates a flow chart illustrating a process for brokered transactions between wireless communication devices in accordance with a preferred embodiment of the present invention.
Figure 3A:
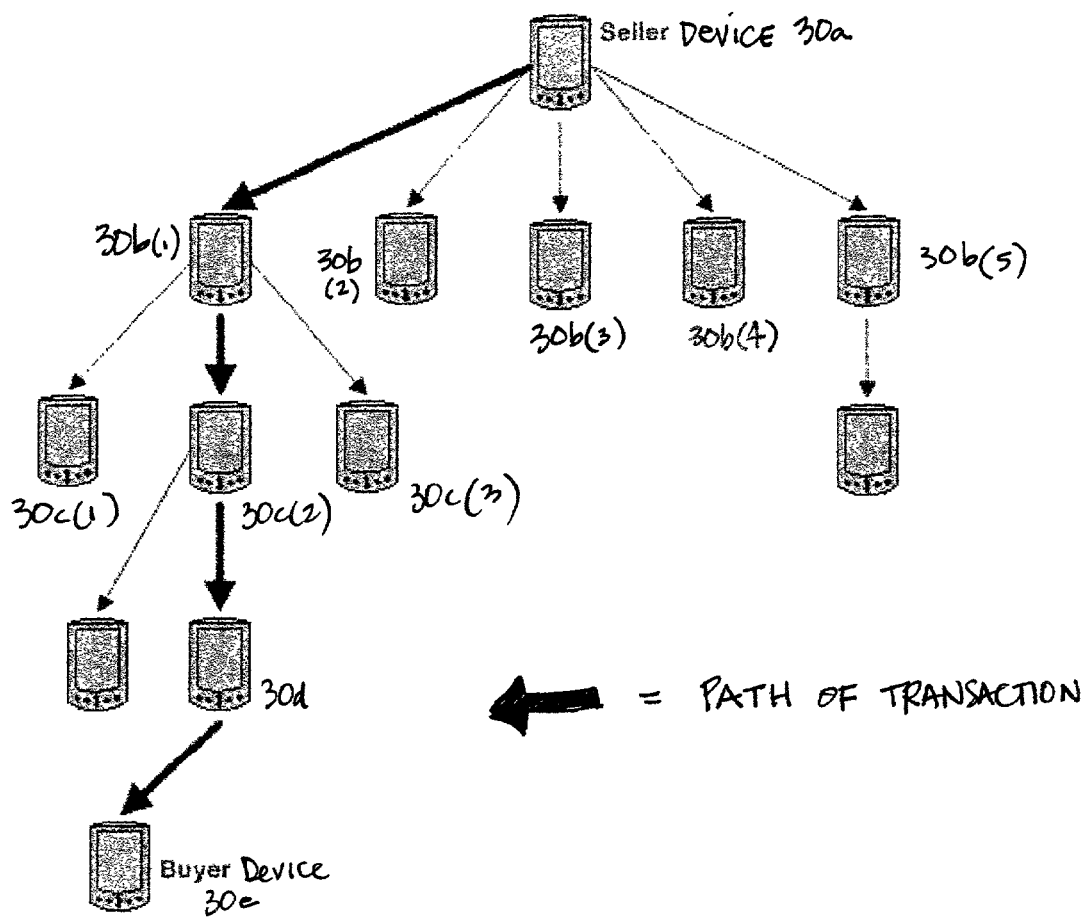
FIG. 3A is a block diagram illustrating a distribution tree in accordance with the preferred embodiment of the present invention.
Figure 3:
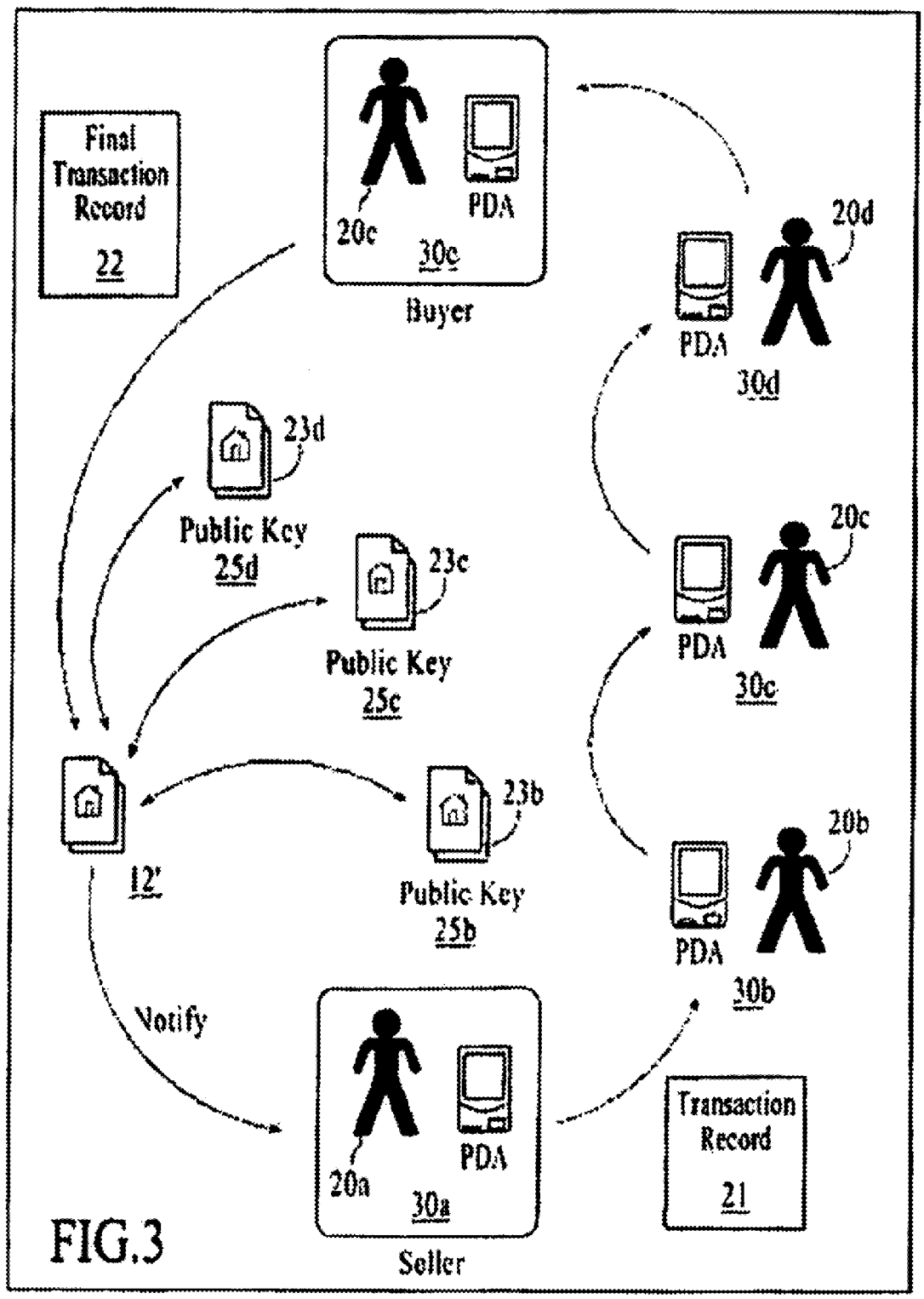
FIG. 3 is a block diagram illustrating the process in FIG. 2.
Figure 3A:
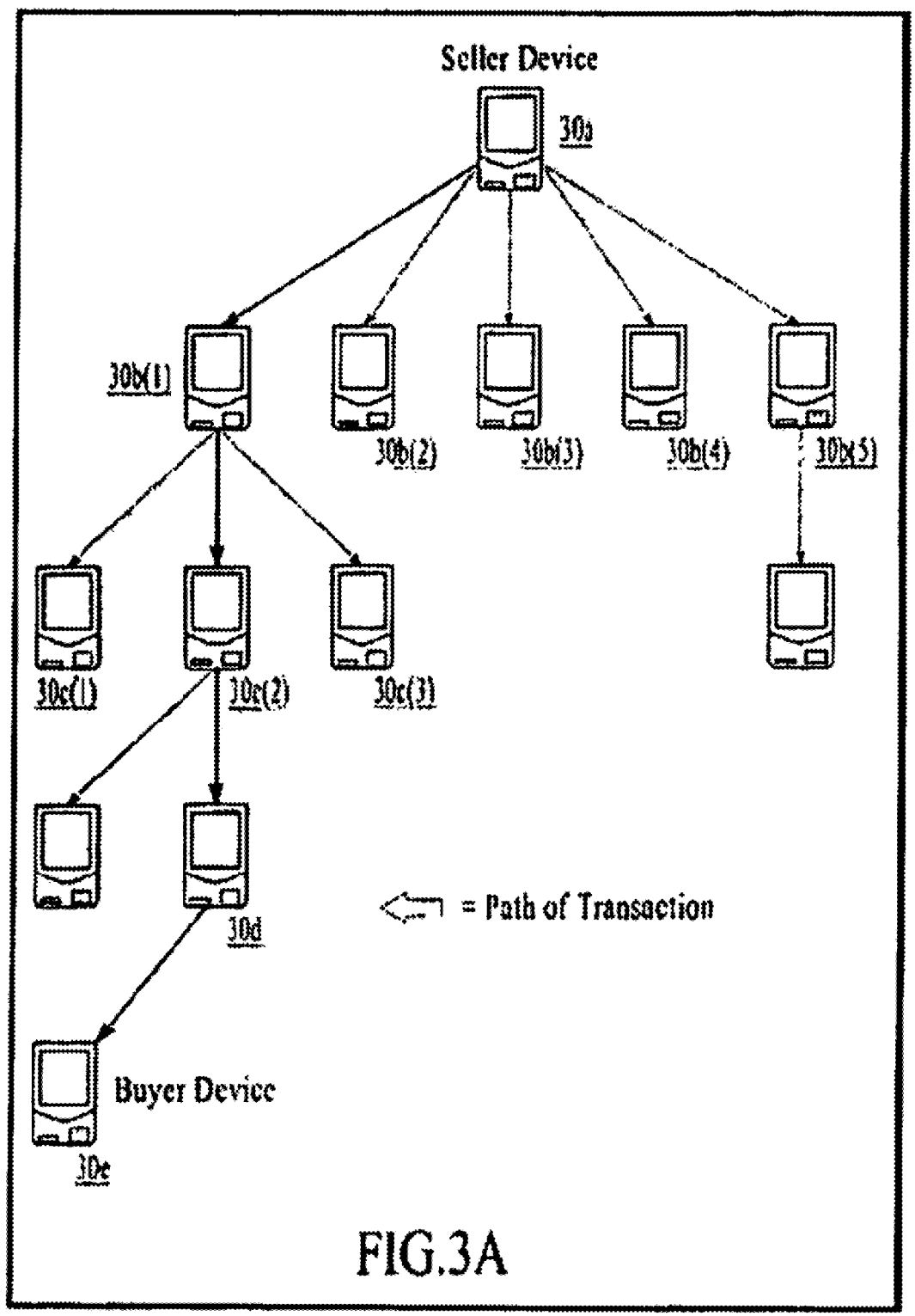

To best illustrate the preferred embodiment of the present invention, please refer now to FIGS. 2 and 3. FIG. 2 is flow chart of the process for automatic brokered transactions using wireless communication devices in accordance with a preferred embodiment of the present invention. FIG. 3 is a block diagram illustrating same process. For the sake of clarity, the process illustrates a situation where a device user 20a wishes to sell an item, i.e., the device acts as a seller 30a. The process 100 begins with the user of a seller device 20a creating a transaction record 21 that includes a plurality of fields into which data related to an item for sale or purchase is entered, via step 110. In this instance, the user of the seller device 20a is the transaction creator or originator. The user 20a can create the transaction record 21 by entering data directly into the seller device 30a, or by entering data into a desktop computer and transmitting the data into the seller device 30a, as is well known to those skilled in the art. Exemplary fields in the transaction record 21 include:

a) a transaction number assigned by the seller device 30a or the facilitator 12';
b) an item description (text field);
c) UPC bar code decode of the item, if available;
d) Minimum Sale Price (if selling item) or Maximum Purchase Price (if buying item);
e) Final customer's offer price (left blank until offer is made);
f) Expiration date and time of offer to sell or buy;
g) Count of brokers in transaction (set at zero by transaction originator);
h) Web address of facilitator 12'; and
i) Identifying Information.

The above list is exemplary and is by no means limited to those items.

Next, the seller device 30a is circulated, i.e., the user 20a carries the seller device 30a into a public area, among other devices 30 (FIG. 1) similarly configured. As the seller device 30a moves into and out of the range of the other devices 30, the seller device 30a is programmed to spontaneously establish communications with the other similarly configured devices 30 via each device's transceiver in step 120. When the seller device 30a "meets" a first device 30b, the seller device 30a and first device 30b exchange information related to items for sale (or offers to buy items) by exchanging their respective transaction record(s) 21, via step 130. In a preferred embodiment, each device asks the other whether it is interested in receiving information related to items for sale (or offers to buy items) before transmitting such information.

Preferably, the seller device 30a exchanges data with each device 30 (FIG. 1) it meets. Thus, although FIG. 3 shows the seller device 30a meeting only one device 30b, it should be noted that the seller device 30a actually meets a plurality of first devices 30b, and not just a single device. For example, in FIG. 3A, the seller device 30a meets five (5) separate "first devices" 30b(1)–30b(5). They, in turn, potentially meet another group of devices, e.g., device 30b(1) meets three (3) devices 30c(1)–30c(3). Thus, as devices 30 meet and exchange information, the distribution tree, as shown in FIG. 3A, grows exponentially because each device 30 communicates with a plurality of devices 30, which in turn communicate with another plurality of devices 30. According to the preferred embodiment, only one branch of the distribution tree results in a transaction. In FIG. 3A, the one branch is represented by the bolded arrows. Thus, the facilitator's 12' resources are not needlessly taxed.

Referring again to FIG. 2, once the first device 30b receives the transaction record 21 from the seller device 30a, the user of the first device 20b decides whether he or she is interested in the transaction, i.e., interested in buying the object, via step 140. In a preferred embodiment of the present invention, the device 30 can be programmed to screen for certain types of items so that items of interested are automatically brought to the attention of the owner 20, while others are automatically placed in the unwanted category. Those items in the unwanted category can be further screened so that the device 30 automatically deletes certain types of items, e.g. pornographic materials. The owner 20 can, but is not required to, review the other items and choose which ones to propagate.

If the owner 20 is interested in the transaction (step 140), a response, e.g. an offer to buy or sell, will be forwarded to the facilitator 12' along with a final transaction record 22 in step 170. If the owner 20 is not interested in purchasing or selling the item, but wishes to act as a broker for the item by passing the transaction record to other devices 30, the transaction record 21 will be modified in step 150.

The transaction record 21 is modified to reflect the first device's 30b role as a broker. Thus, according to a preferred embodiment of the present invention, the first device 30b modifies the transaction record 21 by changing the seller device's 30a Minimum Sale Price (field (d)) to reflect the first device's 30b broker fee. Naturally, if the transaction was an offer to purchase, the Maximum Purchase Price would be "marked down." The broker count (field (g)) is incremented by one to indicate that the first device 30b is a broker.

Finally, the identifying information (field (i) in the transaction record) is modified in two ways. First, it is modified to conceal the web address/identity of the user 20 of the transmitting device, in this case the user of the seller device 20a. In a preferred embodiment, the web address and identity of the user of the transmitting device (seller device 20a) is encrypted, and the key 25 is known only by the user 20 of the encrypting device (in this case the user of the first device 20b). Second, the identifying information further is modified by appending an unencrypted web address/identity of the user of the encrypting device. The appended web address/identity includes a pointer to a file in the user's website 23 where the user's public key 25 can be accessed.

In step 160, the first device 30b then transmits the modified transaction record to a second device 30c when it meets the second device 30c in the same manner that the seller device 30a met and transmitted the original transaction record 21 to the first device 30b. The user of the second device 20c decides whether it is interested in the transaction in step 140. If not, the modified transaction record is once again modified in step 150 in the manner described above. For instance, the Minimum Sale Price is changed a second time to reflect the second device's 30c broker fee, and the broker count incremented by one (count=2). The identifying information field will now be expanded to include an encrypted web address/identifier for the user of the first device 20b, and an unencrypted web address/identifier for the user of the second device 20c. As before, only the user of the second device 20c has knowledge of the key 25c to unencrypt the web address/identifier of the transmitting device's user 20, in this case, the user of the first device 20b. The second device 30c then proceeds to meet and transmit the newly modified transaction record to a third device 30d.

Process steps 140–160 are repeated until a user of a device (buyer device 20e) is interested in purchasing (or selling) the item. As stated above, when this occurs, the user of the buyer device 20e notifies the facilitator 12' in step 170 either using the device 30e or using another device, such as a PC. In either case, communication channels can be wired or wireless, as is well known to those skilled in the art. In the preferred embodiment, the user of the buyer device 20e transmits an electronic message to the facilitator 12', providing the buyer device's 30e user identification and a final transaction record 22 to the facilitator 12' in step 170. The final transaction record 22 now includes the final sales price, and indicates the number of broker devices involved. In this example, three broker devices 30b, 30c, 30d are involved. The identifying information field in the final transaction record 22 includes the unencrypted web address/identifier of the third device's user 20d, which is the most immediate transmitting device for the buyer device 30e, and the encrypted web addresses and identifiers of all the other earlier transmitting devices' 30b, 30c users. In step 180, the facilitator 12' uses the final transaction record 22 to facilitate and complete the transaction.

Figure 4:
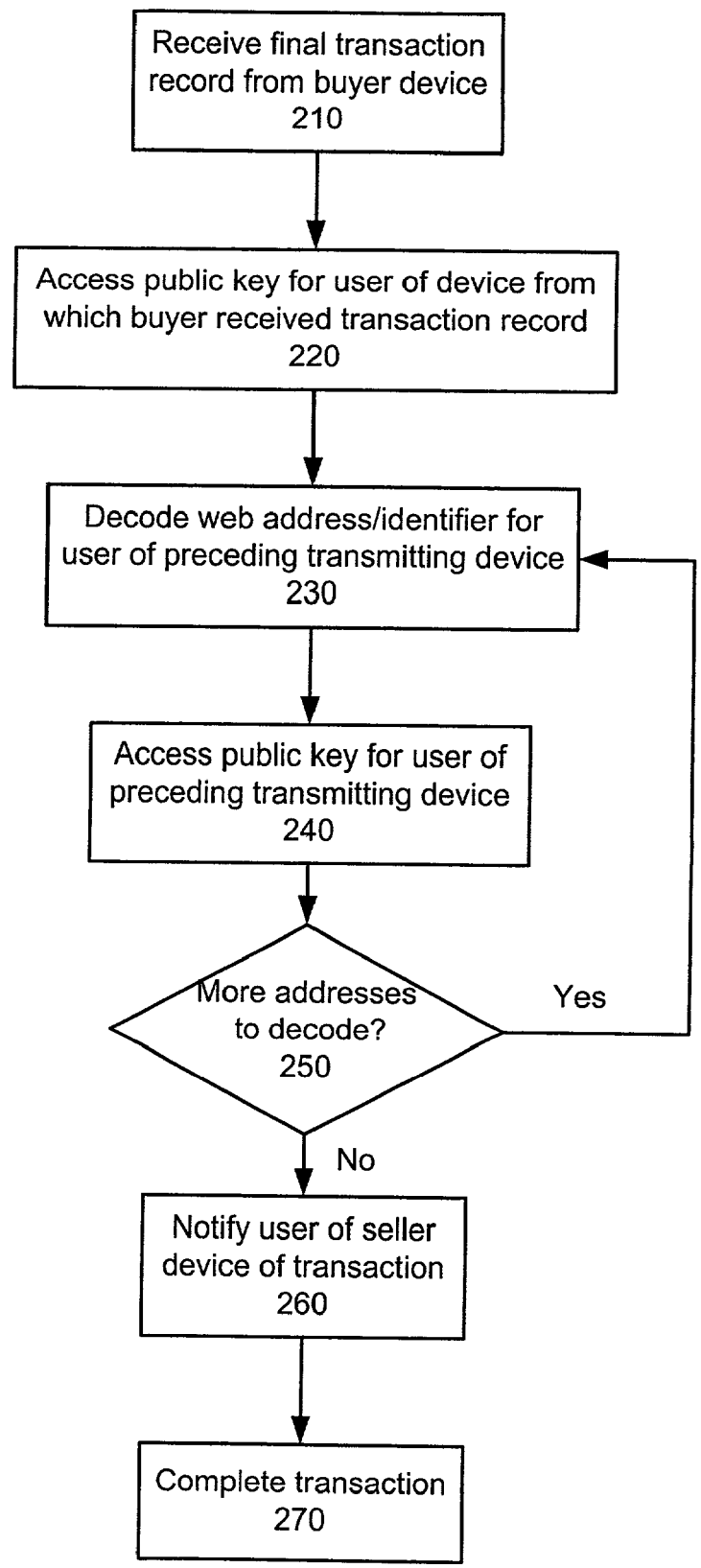
FIG. 4 is a flow chart illustrating a process for facilitating a brokered transaction between wireless communication devices in accordance with the preferred embodiment of the present invention.

FIG. 4 is a flow chart illustrating the facilitator process for completing the transaction in accordance with the preferred embodiment of the present invention. The process 200 begins when the facilitator 12' receives the final transaction record 22 from the user of the buyer device 20e, via step 210. As stated above, the final transaction record 22 includes the unencrypted web address/identifier of the user of the (third) device 20d from which the buyer device 30e received the transaction record. The web address/identifier includes a pointer to the user's public key 25 at the user's web site 23. Using that information, the facilitator 12' contacts the web site 23d associated with the third device's user 20d and accesses the public key 25d in step 220. With the key of the third device's user 25d, the facilitator 12' can decode the encrypted web address/identifier of the user of the third device's 30d preceding transmitting device, i.e. the user of the second device 20c, via step 230. In another preferred embodiment of the present invention, the facilitator 12' transmits the last encrypted web address/identifier to the third device's user's web site 23d and the third device's user 20d returns the unencrypted web address/identifier of the user 20 of the preceding transmitting device, i.e., the second device's user 20c.

Note that a user's public key 25 is valid only to unencrypt the web address/identifier of the preceding transmitting device's user 20. The key 25 will not decode any of the other encrypted web addresses/identifiers of the users 20 earlier in the chain. This is so to protect the brokers' financial interests in the transaction. By encrypting the identifier and web address of the preceding device's user 20, the encrypting device's user 20 ensures he or she will not be "cut out" of the transaction loop. In other words, in order to identify the user 20 of the originating device in the chain, i.e., the seller device's user 20a, the facilitator must follow a transaction path through each broker to attain the key 25 to eventually decode the web address/identifier for the user of the seller device 20a.

Referring again to FIG. 4, once the facilitator 12' decodes the web address/identifier of the second device's user 20c using the key 25d associated with the third device's user 20d, the facilitator 12' contacts the second device owner's web site 23c and accesses the key associated with the second device's user 25c, via step 240. If there are more encrypted addresses to decode, the process repeats steps 230–250. Thus, in this example, the process will loop through two additional times because the second device 30c has encrypted the web address/identifier of the first device's user 20b, and the first device 30b has encrypted the web address/identifier of the selling device's user 20a. When the web address/identifier for the user of the selling device 20a is decoded, all web addresses/identifiers in the final transaction record will have been decoded and all brokers will be identified.

Next, in step 260, the facilitator 12' will notify the user of the seller device 20a of the transaction, and in step 270, complete the transaction. In one embodiment of the present invention, the facilitator 12' will notify the seller device's user 20a via an electronic message or by posting a message on the web site. The facilitator 12' will complete the transaction by "billing" the user of the buyer device 20e for the item using "Internet money" or a payment service, such as "PayPal." The facilitator 12' will then distribute the transaction proceeds to the user of the seller device 20a and to the users of the brokers 20b, 20c, 20d through direct payment, account credit, payment service, or any other means as is well known to those skilled in the art.

In the process of the preferred embodiment described above, each device $30_n$ modifies the transaction record and transmits it to another device $30_{n+1}$ until a buyer device emerges. At that point, the facilitator 12' takes control and completes the transaction. Nevertheless, according to the preferred embodiment of the present invention, at least two other situations will bring the transaction to a close. In the first situation, a transaction will be terminated if a buyer (or seller) is not found within a predetermined number of transmissions. As stated above, each time the transaction record is transmitted to another device, the broker count increments by one. Thus, if the broker count exceeds a predetermined number, set by default or by the transaction originator, then the transaction will automatically terminate. In the second situation, if a buyer (or seller) is not found within the expiration time and date chosen by the transaction originator (seller device 30a), then the transaction will automatically terminate. Whichever condition occurs first will trigger termination. While two situations are explicitly described, those skilled in the art would readily recognize that other conditions could be cause for termination. For instance, the user 20 of a device 30 could program into the device 30 a default transaction period, e.g., 48 hours, within which a transaction record 21 will be propagated and beyond which the transaction record 21 will be automatically terminated. Such other conditions would fall within the spirit of the present invention.

Through aspects of the present invention, exposure to an item for sale or for purchase grows exponentially as more and more wireless communication devices come within range of one another and exchange information. Because transactions are automated, essentially no effort on the part of a broker is required in order for the broker to make a profit on a transaction. Thus, the broker's fee can be relatively small, and more brokers can participate in the transaction. In addition, each device can be involved in multiple transactions where the device is a seller, a buyer, and a broker simultaneously. Thus, a wireless communication device can actually earn money for its owner while it is being carried around.

Although the present invention has been described in accordance with the embodiments shown, one of ordinary skill in the art will readily recognize that there could be variations to the embodiments and those variations would be within the spirit and scope of the present invention. For instance, the wireless communication device could be a stationary device, such as a desktop computer. When a mobile wireless communication device comes within the computer's range, sales information can be exchanged between the devices. Accordingly, many modifications may be made by one of ordinary skill in the art without departing from the spirit and scope of the appended claims.

What is claimed is:

1. A method for brokering a transaction between a plurality of wireless communication devices, comprising the steps of:
    a) enabling each wireless device to transmit data directly to and receive data directly from other similarly enabled wireless devices over a wireless personal area network, wherein each wireless device is a client device associated with a user;
    b) entering a request related to an object to be brokered into a first enabled wireless device;
    c) transmitting the request directly from the first wireless device to other wireless devices over the wireless personal area network such that the users associated with each of the other enabled wireless devices are notified of the request;
    d) receiving a response to the request by a third party facilitator from a user of a wireless device interested in completing the transaction; and
    e) completing the transaction by the third party facilitator.

2. The method of claim 1, wherein each of the plurality of wireless devices includes a transceiver that is compatible with IEEE 802.15 open standards for communication over the wireless personal area network.

3. The method of claim 1, wherein the enabling step (a) further comprises the steps of:
    a1) loading a software application into the first wireless device.

4. The method of claim 3, wherein the software application instructs the first wireless device to automatically establish communications with the plurality of enabled wireless devices.

5. The method of claim 1 further comprising the step of:
    f) determining whether the user of each one of the other wireless devices would like to receive the request prior to sending the request.

6. The method of claim 1, further including the step of providing the request as a transaction record for the object, wherein the transaction record includes an item description, price information, expiration time and date, contact information for the third party facilitator, and identifying information for the user of the first wireless device.

7. The method of claim 6, wherein the third party facilitator is coupled to an Internet, the method further including the step of providing the contact information for the facilitator as a web address.

8. The method of claim 6, wherein transmitting the request further includes the steps of:
    c1) transmitting automatically the request to a first plurality of enabled wireless devices;
    c2) by each one of the plurality of enabled wireless devices receiving the request, modifying the request by concealing the identifying information of a user of the wireless device from which the request was received if the user of the enabled wireless device receiving the request is not interested in completing the transaction; and
    c3) transmitting the modified request from each of the enabled wireless devices receiving the request directly to another plurality of enabled wireless devices.

9. The method of claim 8, wherein transmitting the modified request comprises the step of:
    (c3i) determining whether the user of each one of the other enabled wireless devices would like to receive the modified request prior to sending the modified request.

10. The method of claim 8, wherein the step of modifying the request (c2) further includes the steps of:
    (c2i) modifying the transaction record by changing the price information to create a profit for the one enabled wireless device's involvement in the transaction;
    (c2ii) encrypting the identifying information for the user of the wireless device from which the request was received; and
    (c2iii) appending to the modified transaction record unencrypted identifying information for the user of the one enabled wireless device.

11. The method of claim 10, wherein transmitting the request further includes the steps of:
   c4) repeating steps (c2) and (c3) until the user of the wireless device receiving the request is interested in completing the transaction and responds to the request.

12. The method of claim 10, wherein the identifying information includes an address to a website of the user and a pointer to a public key associated with the user in the website.

13. The method of claim 12, wherein completing the transaction further includes the steps of:
   e1) receiving a final transaction record from the user of the wireless device interested in completing the transaction, wherein the final transaction record includes final price information, the encrypted identifying information for the user of each wireless device that modified the transaction record, and the appended unencrypted identifying information for the user of the wireless device that transmitted the final transaction record to the wireless device associated with the interested user;
   e2) decoding the encrypted identifying information for the user of each wireless device that modified the transaction record and for the user of the first wireless device;
   e3) completing the transaction between the first wireless device's user and the interested user; and
   e4) distributing to the user of each wireless device that modified the transaction record and to the user of the first wireless device their appropriate shares of transaction proceeds.

14. The method of claim 13, wherein the decoding step (e2), further includes the steps of:
   (e2i) contacting the website of the user of the wireless device that transmitted the final transaction record to the wireless device associated with the user interested in completing the transaction via the appended unencrypted identifying information;
   (e2ii) requesting and receiving therefrom the unencrypted identifying information of the user of the wireless device from which the request was received; and
   (e2iii) repeating steps (e2i) and (e2ii) until the identifying information for the user of the first wireless device is decoded.

15. The method of claim 13, wherein the decoding step (e2), further includes the steps of:
   (e2i) contacting the website of the user of the wireless device that transmitted the final transaction record to the wireless device interested in completing the transaction using the appended unencrypted identifying information;
   (e2ii) accessing the associated public key via the pointer to decode encrypted identifying information, wherein the associated public key only decodes the identifying information for the user of the wireless device from which the request was received; and
   (e2iii) repeating steps (e2i) and (e2ii) until the encrypted identifying information for the user of the first wireless device is decoded.

16. The method of claim 15, wherein the completing step (e3) further includes the step of:
   (e3i) notifying the user of the first wireless device of the transaction via electronic mail.

17. The method of claim 16, wherein the completing step (e3) further includes the step of:
   (e3ii) notifying the user of the first wireless device of the transaction via a bulletin board posting on a web site for the facilitator.

18. The method of claim 11, wherein the transaction record further includes a counter for counting a number of times the transaction record has been modified, the method further comprising the step of:
   f) terminating the transaction if the number of times the transaction record has been modified exceeds a preset value.

19. The method of claim 11, further comprising the step of:
   f) terminating the transaction if an expiration time and date has expired.

20. The method of claim 6, wherein entering the request further comprises the step of:
   b2) using a desktop computer system to create the transaction record, and transferring the transaction record to the enabled wireless device.

21. A system for brokering a transaction between a plurality of wireless communication devices comprising:
   a first wireless device enabled to transmit data directly to and receive data directly from other enabled wireless devices over a wireless personal area network, wherein each of the first and the other enabled wireless devices is a client device associated with a user; and
   a third party facilitator accessible to the user of the first wireless device and users of the plurality of enabled wireless devices after registration via a network;
   wherein a request related to an object to be brokered is entered by the user into the first wireless device and transmitted directly from the first wireless device to other enabled wireless devices over the wireless personal area network such that the users associated with each of the other wireless devices are notified of the request; wherein the user of one of the other wireless devices submits a response to the third party facilitator if the user is interested in completing the transaction, and the third party facilitator completes the transaction between the interested user and the user of the first wireless device.

22. The system of claim 21 further including a first broker device, wherein the first broker device receives the request from the first wireless device, modifies the request, and transmits the modified request to the one wireless device.

23. The system of claim 22, wherein the first broker device modifies the request by changing price information to create a profit for the first broker device's involvement in the transaction.

24. The system of claim 23, wherein the first broker device further modifies the request by encrypting identifying information related to a user of the wireless device from which the request was received, and by appending to the request the identifying information for the user of the first broker device, such that a wireless device receiving the modified request from the first broker device is aware of the first broker device's user's identity only.

25. The system of claim 24, wherein the first broker device transmits the modified request to a second broker device, wherein the second broker device similarly modifies the modified request and transmits the twice modified request to the one wireless device.

26. The system of claim 25, wherein the identifying information includes an address for a website for a user of a wireless device and a pointer to a public key associated with the user in the website.

27. The system of claim 26, wherein the third party facilitator receives the response from the user of the one wireless device, the response including a final modified request, wherein the final modified request includes final price information, the encrypted identifying information for the user of the first broker device and the user of the first wireless device, and the unencrypted identifying information for the user of the second broker device that transmitted the final modified request to the one wireless device.

28. The system of claim 27, wherein the third party facilitator decodes the encrypted identifying information for the user of the first broker device by using the public key associated with the user of the second broker device.

29. The system of claim 28, wherein the third party facilitator decodes the encrypted identifying information for the user of the first wireless device by using the public key associated with the user of the first broker device and notifies the first wireless device's user of the transaction.

30. The system of claim 29, wherein the third party facilitator collects payment for the object and distributes payment to the users of the first broker device, the second broker device and the first wireless device.

31. The system of claim 21, wherein each of the plurality of wireless communication devices includes a transceiver that is compatible with IEEE 802.15 open standards for communication over the wireless personal area network.

32. The system of claim 21, wherein the third party facilitator is a server coupled to a network.

33. The system of claim 21, wherein the third party facilitator is a server coupled to an Internet.

34. A method for brokering a transaction using a plurality of wireless devices comprising the steps of:
  a) enabling a first wireless device to automatically transmit data directly to and receive data directly from other enabled wireless devices over a wireless personal area network, wherein each of the first and the other wireless devices is a client device associated with a user;
  b) entering a request related to an object to be brokered into the first wireless device;
  c) transmitting the request from the first wireless device directly to other wireless devices over the wireless personal area network such that the users associated with each of the other wireless devices are notified of the request;
  d) responding to the request by a user interested in completing the transaction by submitting a response to a third party facilitator; and
  e) completing the transaction by the third party facilitator.

35. The method of claim 34, wherein the first wireless device transmits the request to a first plurality of wireless devices and none of the users associated with the first plurality of enabled wireless devices are interested in completing the transaction, the method further including the steps of:
  f) modifying the request in each one of the first plurality of enabled wireless devices; and
  g) transmitting the modified request from each one of the first plurality of enabled wireless devices to a second plurality of enabled wireless devices, thereby increasing distribution exponentially.

36. The method of claim 35, wherein the modifying step (f) further includes the steps of:
  (f1) changing price information to create a profit for the one device's involvement in the transaction;
  (f2) encrypting data that identifies a user of the wireless device from which the request was received, thereby protecting the one device's profit in the transaction; and
  (f3) appending unencrypted identifying information for a user of the one device; wherein by encrypting the data and appending the unencrypted identifying information, the second plurality of wireless devices is aware only of the one device's user's identity.

37. The method of claim 36 further including the step of:
  h) repeating steps (f) and (g) until the user of the one wireless device is located.

38. The method of claim 37 further comprising the step of:
  i) terminating the transaction if a number of times the request has been transmitted exceeds a predetermined value and the user of the one wireless device has not been located.

39. The method of claim 37 further comprising the step of:
  i) terminating the transaction if a preset expiration time and date has expired and the user of the one wireless device has not been located.

40. The method of claim 34, wherein each of the plurality of wireless devices includes a transceiver that is compatible with IEEE 802.15 open standards for communication over a wireless personal area network.

41. A method for facilitating a brokered transaction between a plurality of wireless communication devices, wherein the plurality of wireless communication devices includes a seller device and a buyer device, the method comprising the steps of:
  a) enabling each wireless communication device to transmit data directly to and receive data directly from other similarly enabled wireless communication devices over a wireless personal area network, wherein each wireless communication device is a client device associated with a user;
  b) providing a plurality of broker devices of the plurality of wireless communication devices that disseminate an offer for sale of an item propagated by a user of the seller device;
  c) receiving in a facilitator a response from a user of the buyer device to the offer for sale received from at least two of the broker devices, the response including a final transaction record, wherein the final transaction record includes encrypted identifying information for all but one users of the at least two broker devices, encrypted identifying information for the user of the seller device, and identifying information for a user of one broker device;
  d) decoding the encrypted identifying information; and
  e) completing the transaction between the users of the at least two broker devices, the seller device, and the buyer device.

42. The method of claim 41, wherein identifying information includes a pointer to a public key associated with a user of a wireless device in a website for the user, the decoding step (d) further comprising the steps of:
  d1) identifying the user of the one broker device;
  d2) accessing the associated public key to decode the encrypted identifying information for the user of one other of the at least two broker devices; and
  d3) repeating step (d2) until all the broker devices' users have been identified and the seller device's user has been identified.

43. The method of claim 42, wherein the completing step (e) further includes the steps of:
  e1) notifying the user of the seller device of the transaction via electronic mail and via a bulletin board posting on a web site dedicated to the facilitator;
  e2) collecting payment for the item; and
  e3) distributing payment to the users of the at least two broker devices and the seller device.

44. A computer readable medium containing program instructions for brokering a transaction between a plurality of wireless communication devices, the instructions for:
- a) enabling a first wireless device to transmit data directly to and receive data directly from other enabled wireless devices over a wireless personal area network, wherein each of the first and the other wireless devices is a client device associated with a user;
- b) entering a request related to an object to be brokered into the first wireless device;
- c) transmitting the request directly from the first wireless device to other enabled wireless devices over the wireless personal area network such that the users associated with each of the other enabled wireless devices are notified of the request;
- d) receiving a response to the request by a third party facilitator from a user of one wireless device interested in completing the transaction; and
- e) completing the transaction by the third party facilitator.

45. The computer readable medium of claim 44, wherein the enabling instruction (a) further comprising instructions for:
- a1) loading a software application into the first wireless device.

46. The computer readable medium of claim 45, wherein the instruction for allowing the user to enter a request further includes the instruction for allowing the user to create a transaction record for the object, wherein the transaction record includes an item description, price information, expiration time and date, contact information for the third party facilitator, and identifying information for the user associated with the first wireless device.

47. The computer readable medium of claim 46, wherein the transmitting instruction (c) further includes the instructions for:
- c1) transmitting automatically the request to a first plurality of enabled wireless devices;
- c2) by each one of the plurality of enabled wireless devices receiving the request, modifying the request by concealing the identifying information for a user of the wireless device from which the request was received if the user of the enabled wireless device receiving the request is not interested in completing the transaction; and
- c3) transmitting the modified request from each of the enabled wireless devices receiving the request directly to another plurality of enabled wireless devices.

48. The computer readable medium of claim 47 wherein the instruction for modifying the request (c2) further includes instructions for:
- c2i) modifying the transaction record by changing the price information to create a profit for the one enabled wireless device's involvement in the transaction;
- c2ii) encrypting the identifying information for the user of the wireless device from which the request was received; and
- c2iii) appending to the modified transaction record unencrypted identifying information for the user of the wireless device receiving the request.

49. The computer readable medium of claim 48, wherein the transmitting instruction (c) further includes the instructions for:
- c4) repeating instructions (c2) and (c3) until the user of the wireless device receiving the request is interested in completing the transaction and responds to the request.

50. The computer readable medium of claim 49, wherein the transaction completing instruction (e), further includes instructions for:
- e1) receiving a final transaction record from the wireless device associated with the user interested in completing the transaction, wherein the final transaction record includes final price information, the encrypted identifying information for the user of each wireless device that modified the transaction record, and the appended unencrypted identifying information for the user of the wireless device that transmitted the final transaction record to the wireless device associated with the interested user;
- e2) decoding the encrypted identifying information for the user of each wireless device that modified the transaction record and for the user of the first wireless device;
- e3) completing the transaction between the users of the first wireless device and the interested user; and
- e4) distributing to the user of each wireless device that modified the transaction record and to the user of the first wireless device their appropriate shares of transaction proceeds.

51. The computer readable medium of claim 50, wherein the decoding instruction (e2), further includes instructions for:
- (e2i) contacting the user of the wireless device that transmitted the final transaction record to the one wireless device associated with the interested user via the appended unencrypted identifying information;
- (e2ii) requesting and receiving therefrom the unencrypted identifying information for the user of the wireless device from which the request was received; and
- (e2iii) repeating steps (e2i) and (e2ii) until the identifying information for the user of the first wireless device is decoded.

52. The computer readable medium of claim 50, wherein the identifying information includes a pointer to a public key associated with a user of a wireless device in a user's website, the decoding instruction (e2), further including instructions for:
- (e2i) identifying the user of the wireless device that transmitted the final transaction record to the wireless device associated with the interested user using the appended unencrypted identifying information;
- (e2ii) accessing the associated public key via the pointer to decode the encrypted identifying information for the user of the wireless device from which the request was received; and
- (e2iii) repeating steps (e2i) and (e2ii) until the encrypted identifying information for the user of the first wireless device is decoded.

53. The computer readable medium of claim 47, wherein the transaction record further includes a counter for counting a number of times the transaction record has been modified, and further comprising instructions for:
- f) terminating the transaction if the number of times the transaction record has been modified exceeds a preset value.

54. The computer readable medium of claim 53, further comprising instructions for:
- g) terminating the transaction if the expiration time and date has expired.

* * * * *

UNITED STATES PATENT AND TRADEMARK OFFICE
CERTIFICATE OF CORRECTION

PATENT NO. : 6,999,589 B2
APPLICATION NO. : 09/941877
DATED : February 14, 2006
INVENTOR(S) : Cato et al.

It is certified that error appears in the above-identified patent and that said Letters Patent is hereby corrected as shown below:

Column 12 line 39, delete "users" and replace with --user--.

Formal Replacement Drawings, as shown on the attached pages.

Figures 3 & 3A

Signed and Sealed this

Twenty-sixth Day of February, 2008

JON W. DUDAS
*Director of the United States Patent and Trademark Office*

Disclaimer

6,999,589 — Robert Thomas Cato, Raleigh, NC (US); Phuc Ky Do, Morrisville, NC (US); and Eugene Michael Maximilien, Raleigh, NC (US). METHOD AND SYSTEM FOR AUTOMATIC BROKERED TRANSACTIONS. Patent dated February 14, 2006. Disclaimer filed October 06, 2006, by the assignee, International Business Machines Corporation.

Hereby disclaims all of the claims of said patent.

*(Official Gazette November 25, 2008)*